(12) United States Patent
Alsup et al.

(10) Patent No.: US 8,069,336 B2
(45) Date of Patent: Nov. 29, 2011

(54) TRANSITIONING FROM INSTRUCTION CACHE TO TRACE CACHE ON LABEL BOUNDARIES

(75) Inventors: Mitchell Alsup, Austin, TX (US); Gregory William Smaus, Austin, TX (US)

(73) Assignee: Globalfoundries Inc., Grand Cayman (KY)

( * ) Notice: Subject to any disclaimer, the term of this patent is extended or adjusted under 35 U.S.C. 154(b) by 1434 days.

(21) Appl. No.: 10/726,902

(22) Filed: Dec. 3, 2003

(65) Prior Publication Data
US 2005/0125632 A1    Jun. 9, 2005

(51) Int. Cl.
*G06F 9/30* (2006.01)
(52) U.S. Cl. ........................................ 712/207
(58) Field of Classification Search ............ 712/207
See application file for complete search history.

(56) References Cited

U.S. PATENT DOCUMENTS

| | | | |
|---|---|---|---|
| 3,896,419 A * | 7/1975 | Lange et al. ............ 711/129 |
| 5,210,843 A | 5/1993 | Ayers |
| 5,381,533 A | 1/1995 | Peleg et al. |
| 5,881,261 A | 3/1999 | Favor et al. |
| 5,896,528 A | 4/1999 | Katsuno et al. |
| 5,930,497 A | 7/1999 | Cherian et al. |
| 6,014,742 A | 1/2000 | Krick et al. |
| 6,167,536 A | 12/2000 | Moann |
| 6,185,675 B1 | 2/2001 | Kranich et al. |
| 6,195,744 B1 | 2/2001 | Favor et al. |
| 6,216,206 B1 | 4/2001 | Peled et al. |
| 6,233,678 B1 | 5/2001 | Bala |
| 6,247,121 B1 * | 6/2001 | Akkary et al. ............ 712/239 |
| 6,256,727 B1 | 7/2001 | McDonald |
| 6,256,728 B1 | 7/2001 | Witt et al. |
| 6,339,822 B1 | 1/2002 | Miller |
| 6,345,295 B1 | 2/2002 | Beardsley et al. |
| 6,357,016 B1 | 3/2002 | Rodgers et al. |
| 6,449,714 B1 | 9/2002 | Sinharoy |
| 6,493,821 B1 | 12/2002 | D'Sa et al. |

(Continued)

FOREIGN PATENT DOCUMENTS
EP    0 957 428    11/1999
(Continued)

OTHER PUBLICATIONS

Rotenberg et al. "Trace Cache: A Low Latency Approach to High Bandwidth Instruction Fetching". Published in the Proceedings of the 29th Annual International Symposium on Microarchitecture, Dec. 2-4, 1996. pp. 24-35.*

(Continued)

*Primary Examiner* — Robert Fennema
(74) *Attorney, Agent, or Firm* — Robert C. Kowert; Meyertons, Hood, Kivlin, Kowert & Goetzel, P.C.

(57) ABSTRACT

Various embodiments of methods and systems for implementing a microprocessor that includes a trace cache and attempts to transition fetching from instruction cache to trace cache only on label boundaries are disclosed. In one embodiment, a microprocessor may include an instruction cache, a branch prediction unit, and a trace cache. The prefetch unit may fetch instructions from the instruction cache until the branch prediction unit outputs a predicted target address for a branch instruction. When the branch prediction unit outputs a predicted target address, the prefetch unit may check for an entry matching the predicted target address in the trace cache. If a match is found, the prefetch unit may fetch one or more traces from the trace cache in lieu of fetching instructions from the instruction cache.

35 Claims, 6 Drawing Sheets

U.S. PATENT DOCUMENTS

| | | | |
|---|---|---|---|
| 6,578,128 | B1 | 6/2003 | Arsenault et al. |
| 6,823,428 | B2 | 11/2004 | Rodriguez et al. |
| 6,973,543 | B1 | 12/2005 | Hughes |
| 7,003,629 | B1 | 2/2006 | Alsup |
| 2002/0095553 | A1 | 7/2002 | Mendelson et al. |
| 2002/0144101 | A1 | 10/2002 | Wang et al. |
| 2003/0023835 | A1 | 1/2003 | Kalafatis et al. |
| 2004/0083352 | A1 | 4/2004 | Lee |
| 2004/0143721 | A1* | 7/2004 | Pickett et al. ............ 711/217 |
| 2004/0193857 | A1 | 9/2004 | Miller et al. |
| 2004/0216091 | A1 | 10/2004 | Groeschel |
| 2005/0076180 | A1 | 4/2005 | Smaus et al. |
| 2005/0125613 | A1 | 6/2005 | Kim et al. |
| 2005/0125632 | A1 | 6/2005 | Alsup et al. |

FOREIGN PATENT DOCUMENTS

| | | |
|---|---|---|
| GB | 2 381 101 | 4/2003 |
| WO | 2005/041024 | 5/2006 |

OTHER PUBLICATIONS

Braught, Grant. "Class #21—Assemblers, Labels & Pseudo Instructions". Nov. 16, 2000.*

Patterson, David. Hennessy, John. "Computer Architecture: A Quantitative Approach". Morgan Kaufmann Publishers, Inc, 2nd Edition, 1996. pp. 271-278.*

Xia, Huaxia. "Using Trace Cache in SMT". Jun. 10, 2001.*

International Search Report and Written Opinion for PCT/US2004/039269, mailed Dec. 12, 2005, 11 pages.

Yuan Chou, et al., "Instruction Path Coprocessors," Mar. 2000, pp. 1-24.

Friendly, et al., "Putting the Fill Unit to Work: Dynamic Organizations for Trace Cache Microprocessors," Dept. of Electrical Engineering and Computer Sciences, The Univ. of Michigan, Dec. 1998, 9 pages.

Bryan Black, et al., "Turboscalar: A High Frequency High IPC Microarchitecture," Dept. of Electrical and Computer Engineering, Carnegie Mellon Univ., Jun. 2000, pp. 1.

Merten, et al., "An Architectural Framework for Run-Time Optimization," Jun. 2001, pp. 1-43.

Jourdan, et al., "Increasing the Instruction-Level Parallelism through Data-Flow Manipulation," Intel, 11 pages.

Hinton, G., et al., "A 0.18-MUM CMOS IA-32 Processor with a 4-GHZ Integer Execution Unit," IEEE Journal of Solid-State Circuits, vol. 36, No. 11, Nov. 2001, pp. 1617-1627.

Sanjay J. Patel, et al., "replay: A Hardware Framework for Dynamic Optimization," IEEE, vol. 50, No. 6, Jun. 2001, pp. 590-608.

Jacobson, et al., "Instruction Pre-Processing in Trace Processors," IEEE Xplore, Jan. 1999, 6 pages.

Bryan Black, et al., "The Block-Based Trace Cache," IEEE, 1999, pp. 196-207.

Palmer, et al., "Fido: A Cache That Learns to Fetch," Proceedings of the 17$^{th}$ International Conference on Very Large Data Bases, Barcelona, Sep. 1991, pp. 255-264.

Chen et al., "Eviction Based Cache Placement for Storage Caches," USENIX 2003 Annual Technical Conference, (13 pages).

Examination Report for UK 0611775.8, mailed Nov. 30, 2006, 5 pages.

Lai, et al., "Dead-Block Prediction & Dead-Block Correlating Prefetchers," 2001 IEEE, 11 pages.

Slechta, et al., "Dynamic Optimization of Micro-Operations," 2002 IEEE, 12 pages.

Jacobson, "High-Performance Frontends for Trace Processors," University of Wisconson-Madison, 1999, pp. 19, 20, 36, 37, 104-122.

U.S. Appl. No. 10/822,468, filed Apr. 12, 2004, Alsup, et al.

* cited by examiner

TRANSITIONING FROM INSTRUCTION CACHE TO TRACE CACHE ON LABEL BOUNDARIES

BACKGROUND OF THE INVENTION

1. Field of the Invention

This invention is related to the field of microprocessors, and more particularly, to microprocessors having trace caches.

2. Description of the Related Art

Instructions processed in a microprocessor are encoded as a sequence of ones and zeros. For some microprocessor architectures, instructions may be encoded with a fixed length, such as a certain number of bytes. For other architectures, such as the x86 architecture, the length of instructions may vary. The x86 microprocessor architecture specifies a variable length instruction set (i.e., an instruction set in which various instructions are each specified by differing numbers of bytes). For example, the 80386 and later versions of x86 microprocessors employ between 1 and 15 bytes to specify a particular instruction. Instructions have an opcode, which may be 1-2 bytes, and additional bytes may be added to specify addressing modes, operands, and additional details regarding the instruction to be executed.

In some microprocessor architectures, each instruction may be decoded into one or more simpler operations prior to execution. Decoding an instruction may also involve accessing a register renaming map in order to determine the physical register to which each logical register in the instruction maps and/or to allocate a physical register to store the result of the instruction.

Typically, instructions are fetched from system memory into instruction cache in contiguous blocks. The instructions included in these blocks are stored in the instruction cache in compiled order. During program execution, instructions are often executed in a different order, such as when a branch is taken within the code. In such cases the instructions following the taken branch cannot generally be fetched from the instruction cache during the same cycle as the branch instruction because they are stored in non-contiguous locations. To attempt to overcome this instruction fetch bandwidth limitation, many superscalar microprocessors incorporate a trace cache.

Trace cache differs from instruction cache in that instructions stored in trace cache are typically stored in execution order as opposed to compiled order. Storing operations in execution order allows an instruction sequence containing a taken branch operation to be accessed during a single cycle from trace cache, whereas accessing the same sequence from instruction cache would require several cycles.

Superscalar microprocessors typically decode multiple instructions per clock cycle. The amount of hardware needed to match the addresses of each instruction within a group being decoded with the starting addresses of traces in the trace cache may be prohibitive. This may greatly increase the difficulty of determining a hit in the trace cache in some cases.

SUMMARY

Various embodiments of methods and systems for implementing a microprocessor that includes a trace cache and attempts to transition fetching from instruction cache to trace cache only on label boundaries are disclosed. In one embodiment, a microprocessor may include an instruction cache, a branch prediction unit, and a trace cache. The prefetch unit may fetch instructions from the instruction cache until the branch prediction unit outputs a predicted target address for a branch instruction. When the branch prediction unit outputs a predicted target address, the prefetch unit may check for an entry matching the predicted target address in the trace cache. If a match is found, the prefetch unit may fetch one or more traces from the trace cache in lieu of fetching instructions from the instruction cache.

The branch prediction unit may output a predicted target address when it encounters a branch instruction for which the branch is predicted to be taken. For example this would be the case for any unconditional branch instruction or any conditional branch instruction for which the branch condition is predicted to be satisfied. The branch prediction unit may also output a predicted target address when any component of the microprocessor discovers that a branch misprediction has occurred. When a conditional branch instruction has entered the execution pipeline, a functional unit may evaluate the associated branch condition when the necessary data is valid. In some instances this evaluation may cause the branch to be taken even though it was predicted to be not taken when then instruction was fetched. The converse situation may occur as well, and either case may result in a branch misprediction that may cause the branch prediction unit to output a branch target address.

The microprocessor may also include a trace generator. In some embodiments, the trace generator may construct traces from instructions that have been executed and retired. In other embodiments, the trace generator may construct traces from decoded or partially decoded instructions prior to execution. In some embodiments a trace may be associated with a tag, which includes the address of the earliest instruction, in program order, stored within the trace. The trace may also include a flow control field that includes a label for an instruction to which control will pass for each branch instruction included in the trace.

The trace generator may wait until it receives an instruction corresponding to a branch target address before beginning the construction of a new trace. Once the construction of a trace has commenced, the trace generator may check the trace cache for a duplicate copy of the trace and if such a copy is found, the trace generator may discard the trace under construction. In some embodiments, when the trace generator identifies a duplicate copy of the trace under construction in trace cache, it may check the trace cache for an entry corresponding to the next trace to be generated and if such an entry is found, the trace generator may discard the trace under construction.

BRIEF DESCRIPTION OF THE DRAWINGS

A better understanding of the present invention can be obtained when the following detailed description is considered in conjunction with the following drawings, in which.

Figure 1:
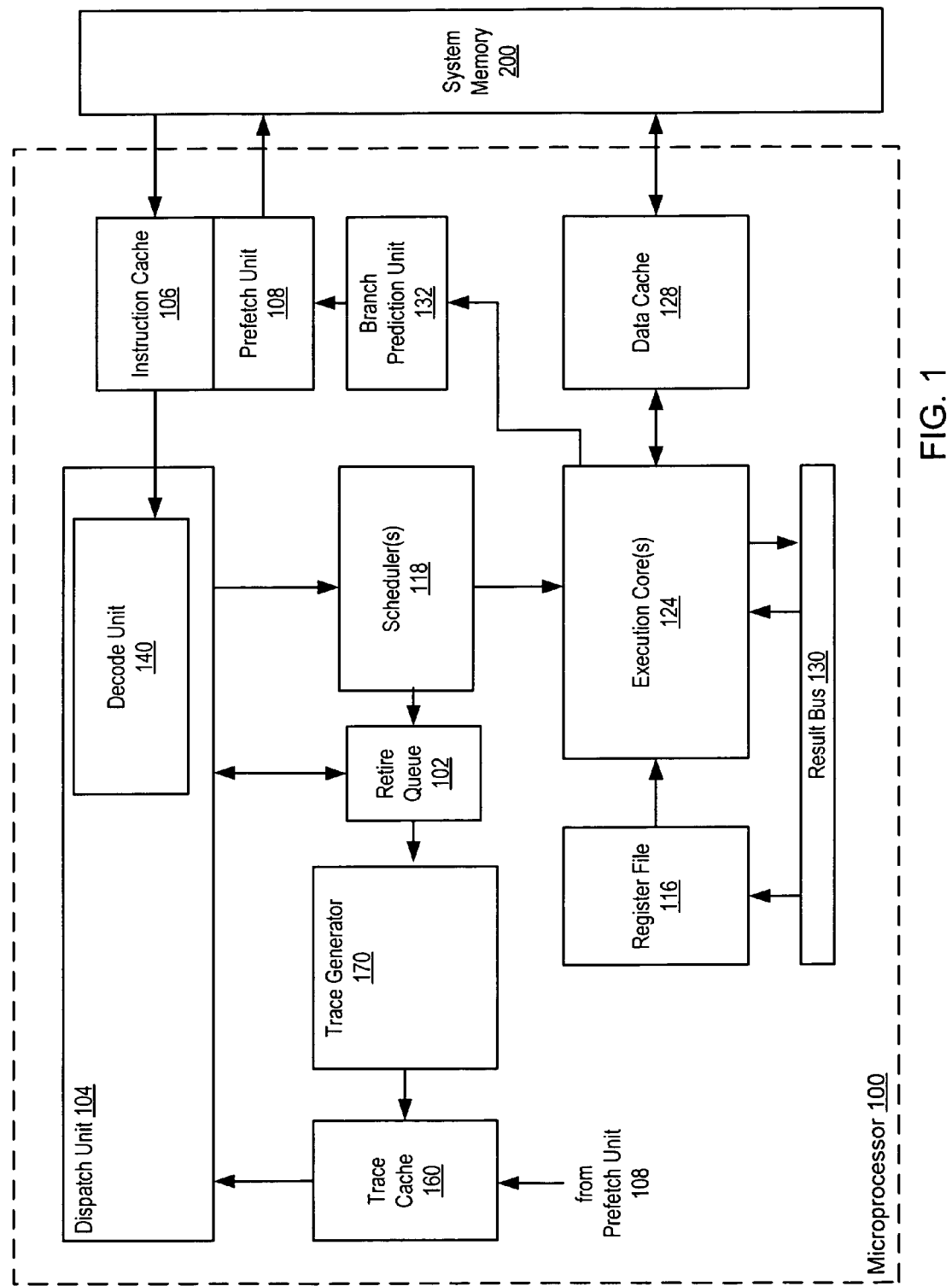
FIG. 1 shows a microprocessor incorporating a trace cache, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of logical components included in one embodiment of a microprocessor 100 which transition from instruction cache 106 to trace cache 160 on label boundaries. Microprocessor 100 is configured to execute instructions stored in a system memory 200. Many of these instructions operate on data stored in system memory 200. Note that system memory 200 may be physically distributed throughout a computer system and may be accessed by one or more microprocessors 100. In some embodiments, the microprocessor 100 may be designed to be compatible with the x86 architecture. Note that microprocessor 100 may also include and/or be coupled to many other components in addition to those shown here. For example, additional levels of cache may be included (internal and/or external to microprocessor 100) between microprocessor 100 and system memory 200. Similarly, microprocessor 100 may include a memory controller configured to control system memory 200 in some embodiments. Additionally, the interconnections between logical components may vary between embodiments.

Microprocessor 100 may include an instruction cache 106 and a data cache 128. Microprocessor 100 may include a prefetch unit 108 coupled to the system memory 200. Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms. Prefetch unit 108 may also fetch instructions from instruction cache 106 and traces from trace cache 160 into dispatch unit 104. Instructions may be fetched from instruction cache 106 in response to a given instruction address missing in trace cache 160. Likewise, instructions may be fetched from system memory 200 in response to a given address missing in instruction cache 106.

A dispatch unit 104 may be configured to receive instructions from instruction cache 106 and to receive decoded and/or partially decoded operations from trace cache 160. The dispatch unit 104 may include a decode unit 140 to decode instructions received from instruction cache 106. The dispatch unit 104 may also include a microcode unit for use when handling microcoded instructions.

The dispatch unit 104 is configured to dispatch operations to scheduler(s) 118. One or more schedulers 118 may be coupled to receive dispatched operations from dispatch unit 104 and to issue operations to one or more execution cores 124. Execution core(s) 124 may include a load/store unit 126 configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue may be configured to determine when each issued operation may be retired.

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

Dispatch unit 104 may output signals including bit-encoded operations executable by the execution core(s) 124 as well as operand address information, immediate data and/or displacement data. Decode unit 140 may be used to decode certain instructions into one or more operations executable within execution core(s) 124. Simple instructions may correspond to a single operation. More complex instructions may correspond to multiple operations. Upon receiving an operation that involves the update of a register, the dispatch unit 104 may reserve a register location within register file 116 to store speculative register states (in an alternative embodiment, a reorder buffer may be used to store one or more speculative register states for each register). A register map may translate logical register names of source and destination operands to physical register names in order to facilitate register renaming. Such a register map may track which registers within register file 116 are currently allocated and unallocated.

When operations are handled by dispatch unit 104, if a required operand is a register location, register address information may be routed to a register map or a reorder buffer. For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that modifies the contents of one of the logical registers. Therefore, at various points during execution of a particular program, register file 116 (or, in alternative embodiments, a reorder buffer) may have one or more registers that contain the speculatively executed contents of a given logical register.

A register map may assign a physical register to a particular logical register specified as a destination operand for an operation. Register file 116 may have one or more previously allocated physical registers assigned to a logical register specified as a source operand in a given operation. The register map may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 116) through load/store unit 126. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The microprocessor 100 of FIG. 1 supports out of order execution. A retire queue 102 (or, alternatively, a reorder buffer) may keep track of the original program sequence for register read and write operations, allow for speculative instruction execution and branch misprediction recovery, and facilitate precise exceptions. In many embodiments, retire queue 102 may function similarly to a reorder buffer. However, unlike a typical reorder buffer, retire queue 102 may not provide any data value storage. In alternative embodiments, retire queue 102 may function more like a reorder buffer and also support register renaming by providing data value storage for speculative register states. In some embodiments, retire queue 102 may be implemented in a first-in-first-out configuration in which operations move to the "bottom" of the buffer as they are validated, thus making room for new entries at the "top" of the queue. As operations are retired, retire queue 102 may deallocate registers in register file 116 that are no longer needed to store speculative register states and provide signals to a register map indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

Retire queue 102 may also provide signals identifying program traces to trace generator 170. Trace generator 170 may also be described as a fill unit. Trace generator 170 may store traces identified by retire queue 102 into trace cache 160. Each trace may include operations that are part of several different basic blocks. A basic block may be defined as a set of consecutive instructions, wherein if any one of the instructions in a basic block is executed, all of the instructions in that basic block will be executed. One type of basic block may be a set of instructions that begins just after a branch instruction and ends with another branch operation. In some embodiments, the traces stored into trace cache 160 may include several decoded or partially decoded instructions. Decoded or partially decoded instructions may be referred to as operations. As used herein, a "trace" is a group of instructions or operations that are stored within a single trace cache entry in the trace cache 160.

Prefetch unit 108 may fetch operations from trace cache 160 into dispatch unit 104. In some embodiments traces may be constructed from decoded or partially decoded instructions from retire queue 102. When such traces are fetched from the trace cache, the decode unit 140 may be at least partially bypassed, resulting in a decreased number of dispatch cycles for the trace cached operations. Accordingly, the trace cache 160 may allow the dispatch unit 104 to amortize the time taken to partially (or fully) decode the cached operations in decode unit 140 over several execution iterations if traces are executed more than once.

The bit-encoded operations and immediate data provided at the outputs of dispatch unit 104 may be routed to one or more schedulers 118. Note that as used herein, a scheduler is a device that detects when operations are ready for execution and issues ready operations to one or more execution units. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by execution core(s) 124 (from register file 116 or result bus 130). In some embodiments, each scheduler 118 may be associated with a dedicated execution core 124. In other embodiments, a single scheduler 118 may issue operations to more than one of the execution core(s) 124.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence.

In one embodiment, each of the execution core(s) 124 may include components configured to perform integer arithmetic operations of addition and subtraction, as well as shifts, rotates, logical operations, and branch operations. A floating point unit may also be included to accommodate floating point operations. One or more of the execution core(s) 124 may be configured to perform address generation for load and store memory operations to be performed by load/store unit 126.

The execution core(s) 124 may also provide information regarding the execution of conditional branch instructions to branch prediction unit 132. If information from the execution core 124 indicates that a branch prediction is incorrect, the branch prediction unit 132 may flush instructions subsequent to the mispredicted branch that have entered the instruction processing pipeline and redirect prefetch unit 108. The redirected prefetch unit 108 may then begin fetching the correct set of instructions from instruction cache 106, trace cache 160, and/or system memory 200. In such situations, the results of instructions in the original program sequence that occurred after the mispredicted branch instruction may be discarded, including those which were speculatively executed and temporarily stored in load/store unit 126 and/or register file 116.

Results produced by components within execution core(s) 124 may be output on the result bus 130 to the register file 116 if a register value is being updated. If the contents of a memory location are being changed, the results produced within execution core(s) 124 may be provided to the load/store unit 126.

Trace Cache

Trace generator 170 may be configured to receive basic blocks of retired operations from retire queue 102 and to store those basic blocks within traces in trace cache 160. Note that in alternative embodiments, trace generator 170 may be coupled to the front-end of the microprocessor (e.g., before or after the dispatch unit) and configured to generate traces from basic blocks detected within the pipeline at that point within the microprocessor. During trace construction, trace generator 170 may perform transformations on basic blocks of operations received from retire queue 102 to form traces. In some embodiments, these transformations may include reordering of operations and elimination of operations.

Figure 2:
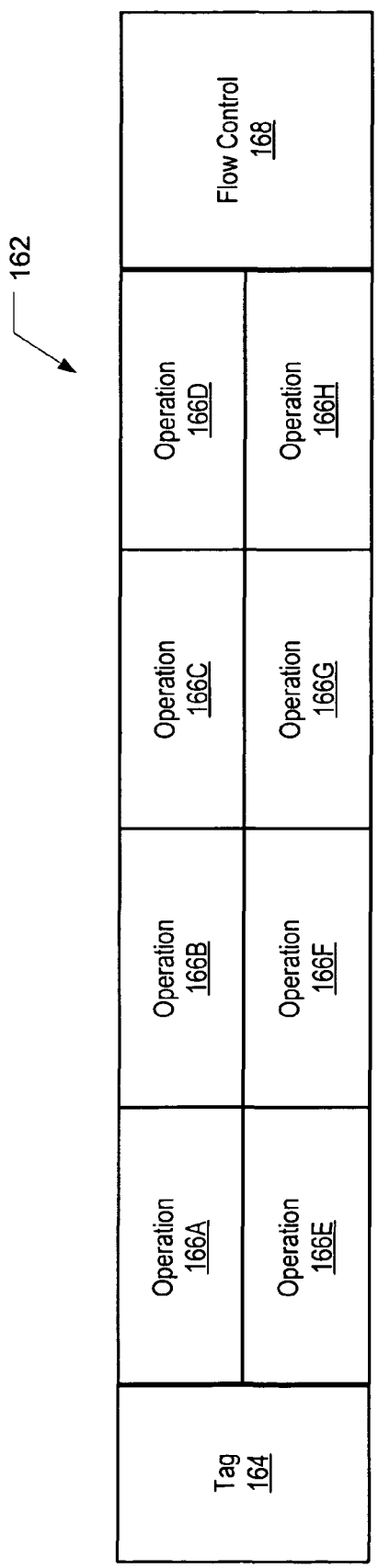
FIG. 2 illustrates an exemplary trace cache entry, according to one embodiment.

FIG. 2 illustrates one embodiment of trace cache 160 along with some components of microprocessor 100 which are coupled to and/or interact with the trace cache. Trace cache 160 may include several trace cache entries 162. Each trace cache entry 162 may store a group of operations referred to as a trace 166. In addition to trace 166, each trace cache entry 162 may also include an identifying tag 164 and flow control (F.C.) information 168. Trace cache entry 162 may include a flow control field 168 for each branch included in the trace. Each control field 168 may include address information to determine which instruction is to be executed next for the cases that the branch is taken and not taken. For example, flow control field 168A may correspond to a first branch instruction included in trace cache entry 162. This first branch may be conditional and flow control field 168A may contain two addresses. One of the addresses may be the address of the instruction to be executed after the branch instruction in the case that the condition is true. The other address may indicate the instruction to be executed next in the event that the branch condition is false. Flow control field 168B 168A may correspond to a second branch instruction included in trace cache entry 162. This branch may be unconditional, and therefore, flow control field 168B may include only the address of the instruction to which control flow should pass under all circumstances.

Tag 164 may be similar to a tag in instruction cache 106, allowing prefetch unit 108 to determine whether a given operation hits or misses in trace cache 160. For example, tag 164 may include all or some of the address bits identifying an operation within the trace cache entry (e.g., the tag may include the address of the earliest operation, in program order, stored within that trace). In some embodiments, the tag may include enough information so that some operations may be independently addressable within a trace. For example, the first operation within each basic block may be addressable through information stored in the tag. In other embodiments, only the first operation within a trace may be addressable.

In some embodiments, flow control information 168 may include a label for each branch operation included within the trace. The label may be an indication identifying the address to which control should branch. For example, a section of assembly language code may include a branch instruction to transfer control of the flow of execution to an instruction other than the instruction that immediately follows the branch in the order the code is written. As a convenience to the coder, some compilers may allow for the inclusion of one or more alphanumeric symbols with the branch instruction. This label may also be included in the assembly code immediately preceding the instruction targeted by the branch instruction. During compilation of the assembly code, the compiler may determine the address of the instruction targeted by the branch instruction and may substitute this address for the alphanumeric symbols included with the branch instruction, and the address of the targeted instruction now may become the label. In other embodiments, labels may be used to identify any basic block of instructions. A label boundary then, may be any point in the code at which the flow of control is transferred to an instruction whose address is a label. The creation of traces and attempts to hit in trace cache may occur with the execution of instructions at label boundaries.

In many implementations, a trace cache entry 162 may include multiple branch instructions and multiple flow control fields 168. Each field of flow control information 168 may be associated with a particular branch operation. For example, in one embodiment, one flow control information storage location 168A within a trace may be associated with the first branch operation in the trace and the other flow control information storage location 168B may be associated with the second branch in the trace. Alternatively, the flow control information may include tags or other information identifying the branch operation with which that flow control information is associated. In yet other embodiments, a branch prediction and/or information identifying which flow control information corresponds to a branch operation may be stored with that branch operation within operation storage 166.

Instruction/Trace Fetching

Prefetch unit 108 may fetch a line of instructions from memory 200 and store the line in instruction cache 106. Instructions may be stored in instruction cache 106 in compiled order. Depending on run-time conditions, the execution order for instructions in instruction cache 106 may frequently vary from their compiled order. For example, the execution of a branch instruction from instruction cache 106 may cause the flow of control to jump to an instruction that is separated from the branch instruction by many intervening instructions according to compiled order. The target of the branch instruction may not be resident in instruction cache 106. This may cause prefetch unit 108 to fetch another line of instructions from system memory 200. During the time in which the next line of instructions is being loaded into instruction cache, execution cores 124 may be idle waiting for the next operations.

In some embodiments, prefetch unit 108 may use a portion of the branch target address to index into trace cache 160. If a valid trace cache entry 162 exists at the indexed location, the prefetch unit may compare tag field 164 with the branch target address. If the tag matches the target address, then prefetch unit 108 may fetch trace 166 to dispatch unit 104 for execution. Dependent upon information received from the execution cores and/or the branch prediction unit, prefetch unit 108 may continue to fetch traces from trace cache 160 to dispatch unit 104 until no entry can be found whose tag field corresponds to the address of the next instruction to be executed. Prefetch unit 108 may then resume fetching instructions from instruction cache 106.

Figure 3:
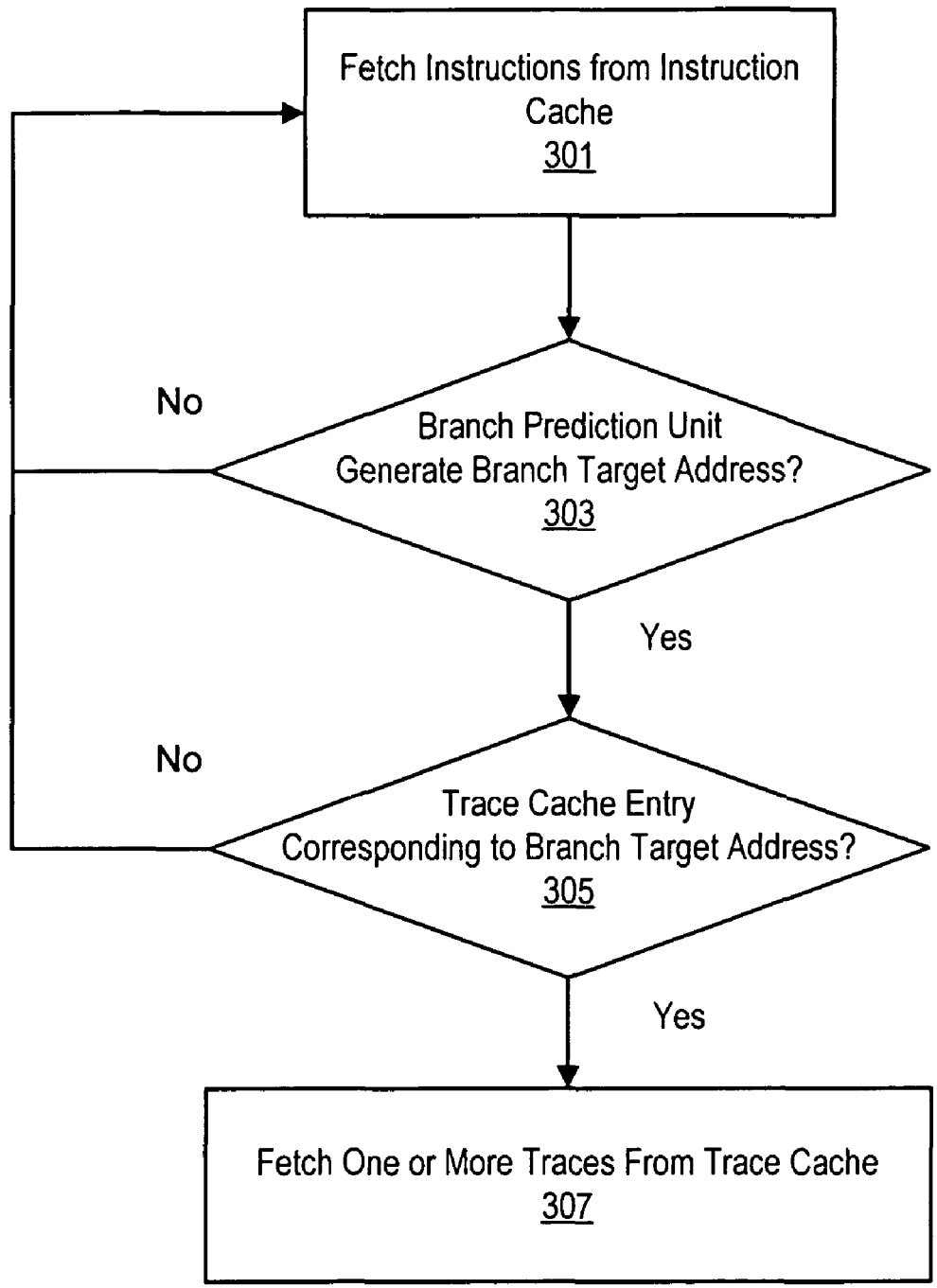
FIG. 3 is a flowchart for a method for fetching instructions from an instruction cache or traces from a trace cache, according to one embodiment.

FIG. 3 is a flowchart for a method for fetching instructions from an instruction cache or traces from a trace cache, according to one embodiment. As shown in block 301, one or more instructions may be fetched from the instruction cache. In some cases the processing of the fetched instructions may not result in the generation of a branch target address. For example, this may be true in cases where no branch operations are decoded from the instructions or decoded branch operations are not taken. Under such circumstances, as shown at 303, instruction fetching from the instruction cache will continue.

In other cases the processing of the fetched instructions may result in the generation of a branch target address. For example, if the condition for a conditional branch is predicted to be satisfied or if an unconditional branch is encountered, or if a branch target misprediction occurs a branch target address may be generated. In these cases, a search of the trace cache may be performed. A portion of the generated branch target address may be used to index into the trace cache, and if a valid entry is stored at the corresponding location, the tag field of the entry may be compared to another portion of the branch target address, as shown at 307. If a match is made, the prefetch unit may fetch the trace from the corresponding entry in the trace cache to the dispatch unit, as shown at 309. The prefetch unit may continue to fetch traces until it encounters an address that misses in the trace cache. At this point, fetching may continue from the instruction cache.

Trace Construction

As stated previously, the fetching of a branch instruction from the instruction cache for which the branch is predicted to be taken may result in the prefetch unit initiating the fetch of the line that includes the branch target instruction. This may result in significant delay in providing instructions to the dispatch unit, particularly when the line storing the branch target instruction is not resident in the instruction cache.

Upon retirement of the branch and subsequent instructions, trace generator 170 may construct a trace that spans the branch label boundary. Even though the branch and target instructions may have been stored in different lines in the instruction cache, they may be retired coincidently, and trace generator 170 may construct a trace that includes the operations corresponding to both instructions.

If the portion of code including the branch instruction is subsequently traversed again, the prefetch unit may fetch the corresponding trace from trace cache 160 rather than fetching the instructions from instruction cache 106. Since the operations targeted by the branch instruction are already incorporated into the trace, the trace may be executed significantly faster than executing the parent instructions from instruction cache 106.

The increase in microprocessor performance gained by fetching from trace cache 160 rather than instruction cache 106 may be proportional to the length of the trace (the number of operations the trace includes). Therefore, it may be desirable to construct traces that contain as many operations as possible. In some embodiments, trace generator 170 may construct traces from retired operations that are fetched from instruction cache 106. When the prefetch unit switches from fetching instructions from the instruction cache to fetching traces from the trace cache, the trace generator may terminate trace construction. Therefore, it may be desirable to limit the rate at which fetching switches from instruction cache to trace cache occur. This may be done by limiting the attempts, by the prefetch unit to hit in trace cache, to label boundaries.

The length of traces constructed by trace generator 170 may be inversely proportional to the frequency with which prefetch unit 108 attempts to hit in trace cache 160. For example, if an attempt is made to hit in the trace cache for each instruction fetched from instruction cache, the prefetch unit may frequently identify corresponding traces and switch from fetching instructions to fetching traces. The trace generator may end trace construction and produce a trace that includes those operations retired since the previous switch. If the previous hit in trace cache occurred within a few instructions, then the number of operations retired in the interim will be small as well, resulting in the production of a trace including a small number of operations.

The fetching and execution of a short trace formed as described above may result in a further increase in the frequency with which the prefetch unit 108 switches between instruction and trace caches. For example, when the trace generation unit 170 terminates the construction of a trace due to a fetching switch from instruction cache to trace cache, some operations that could have been incorporated into the terminated trace may not be, perhaps because they had not retired prior to the time of the switch. The execution of the prematurely terminated trace may result in a switch from the trace cache to the instruction cache in order to fetch the missing instructions. The execution of short traces may be of little benefit in terms of improving microprocessor efficiency as compared to executing the parent instructions from instruction cache.

In some embodiments, the prefetch unit 108 may delay an attempt to hit in the trace cache until the branch prediction unit 132 generates the address of a target instruction. The fetch of a branch instruction from instruction cache may cause the branch prediction unit 132 to predict whether the branch will be taken or not taken when executed. If the prediction is that the branch will be taken, then the branch prediction unit may generate the address of the instruction that is targeted by the branch instruction. The branch prediction unit 132 may also generate the address of the next instruction to be executed after a branch instruction in the case where a branch mispredict occurs. For example, if a conditional branch instruction is fetched and the branch prediction unit 132 predicts that the branch will be taken, but upon resolution of the condition it is determined that the branch should not be taken, the prefetch unit 108 may use the pre-generated address of the next instruction following the conditional branch in compiled order as the address of the next instruction to be fetched. By delaying the attempt to hit in trace cache 160 until the branch target for either branches that are predicted to be taken or branch mispredicts is available, longer traces may be generated.

In embodiments where the prefetch unit waits for a label boundary before attempting to hit in the trace cache, the address used for matching may normally be a branch target. As described previously, a fetching switch may be made from trace cache to instruction cache at any time in order to fetch instructions missing from the trace cache. Therefore, the stream of retired instructions to the trace generator 170 may begin at any point with regard to label boundaries. In embodiments where attempts to hit in trace cache are made only on label boundaries, the beginning of trace construction may be delayed to coincide with label boundaries as well. This may insure that the addresses of the first instructions of traces will be labels.

When the trace generator performs a search of the trace cache, if an existing entry is found which matches the tag of the newly completed trace, the matching entry may be invalidated, the newly completed trace may be discarded, and the trace generator may wait for operations from the next branch boundary to be retired before beginning construction of a new trace. In some embodiments, when the trace generator identifies a duplicate copy of the trace under construction in trace cache, it may check the trace cache for an entry corresponding to the next trace to be generated and if such an entry is found, the trace generator may discard the trace under construction. In other embodiments, the trace generation unit may wait until two or more sequentially generated trace entries duplicate existing entries in the trace cache before discarding the traces and delaying the start of new construction until a label boundary is reached. In yet other embodiments, when duplicate existing entries are identified in the trace cache, those entries may be invalidated.

Figure 4:
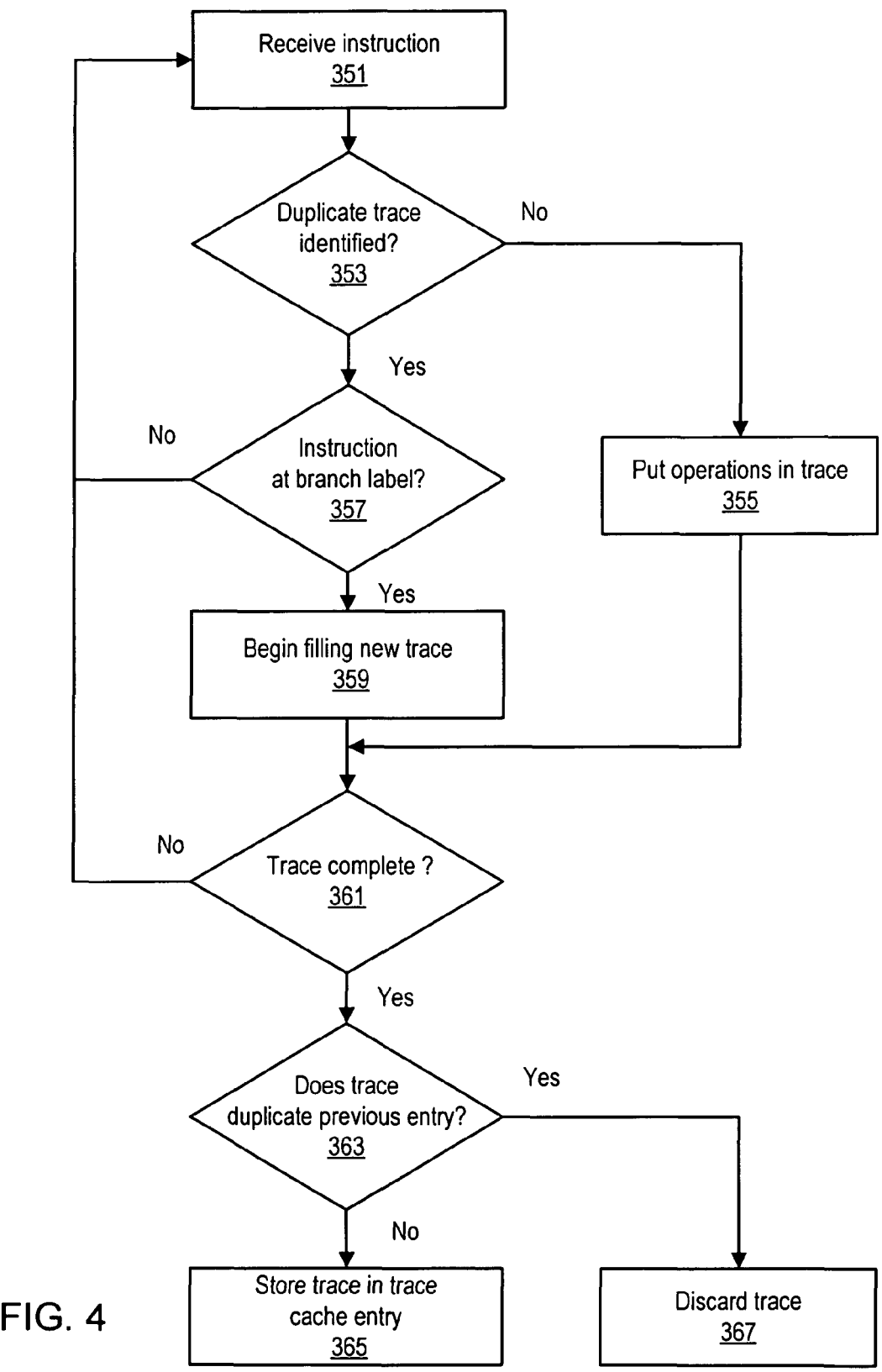
FIG. 4 is a flowchart for a method for constructing traces, according to one embodiment.

FIG. 4 is a flowchart for a method for constructing traces, according to one embodiment. Block 351 shows an instruction being received. At 353, if a trace or traces duplicating the trace under construction and/or the next trace to be constructed have not been identified in the trace cache, the operations corresponding to the instruction may be used to fill vacant operation positions for a trace, as shown at 355. On the other hand, if a duplicate trace or traces have been identified at decision block 353, the instruction may be checked to determine whether it corresponds to a branch label. If it is determined at decision block 357 that the instruction does not correspond to a branch label, the instruction may be discarded. Instructions may continue to be discarded until an instruction corresponding to a branch label is received.

As illustrated at 357, if one of the received operations is determined to be the first operation at a branch label, then the filling of operation positions in a new trace may commence, as indicated at 359. Block 361 indicates that when a trace is completed, the trace cache may be searched, as shown at 363 to identify corresponding entries. If a matching entry is identified, the just-completed trace may be discarded, as shown at 367. If no duplicate entry is found at block 363, the new trace may be stored in a trace cache entry. In some embodiments, the duplicate entry may not be discarded until several duplicate successive duplicate entries are found.

Exemplary Computer Systems

Figure 5:
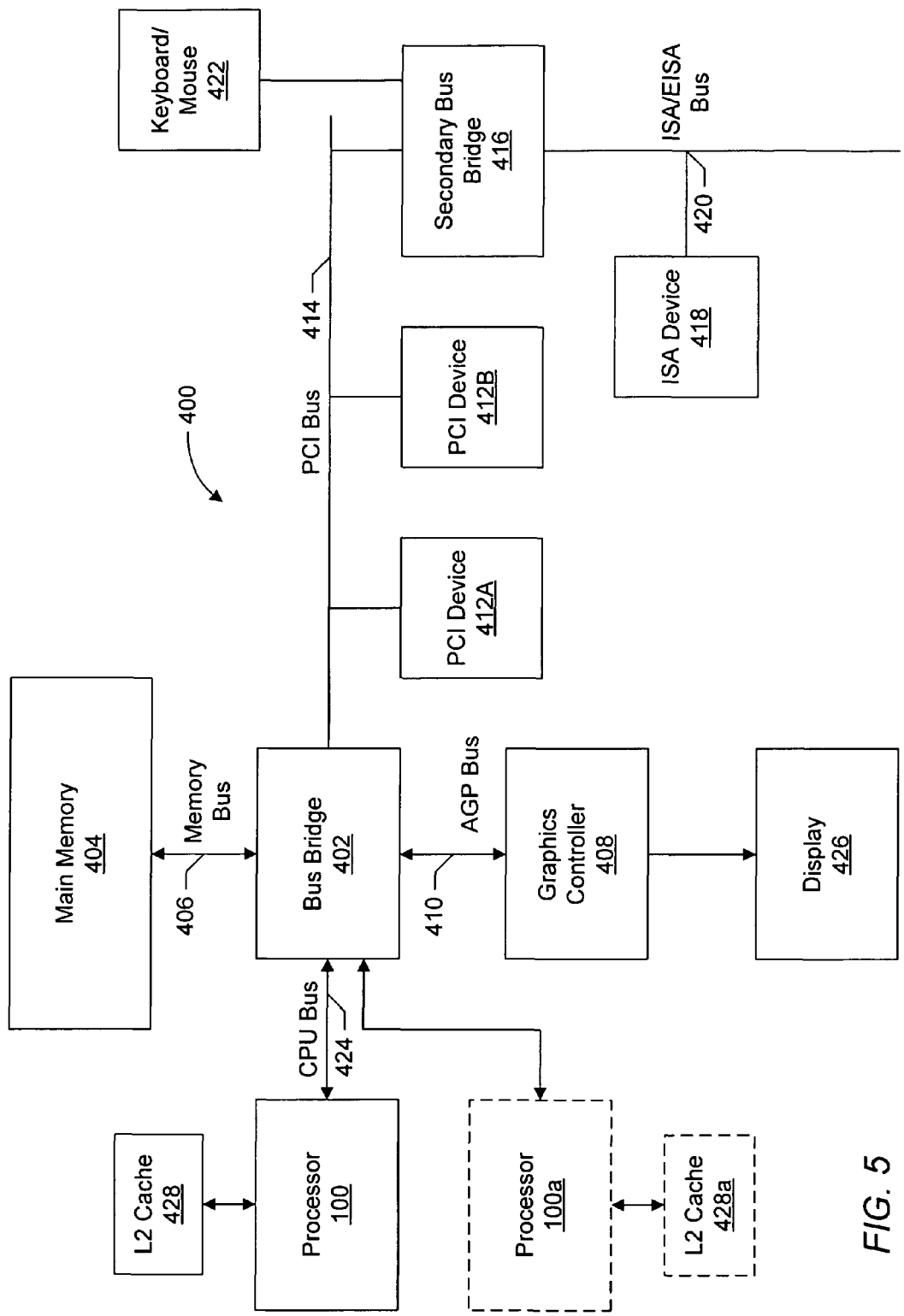
FIG. 5 shows one embodiment of a computer system.

FIG. 5 shows a block diagram of one embodiment of a computer system 400 that includes a microprocessor 100 coupled to a variety of system components through a bus bridge 402. Microprocessor 100 may include an embodiment of a trace cache generator 170 as described above. Other embodiments of a computer system are possible and contemplated. In the depicted system, a main memory 200 is coupled to bus bridge 402 through a memory bus 406, and a graphics controller 408 is coupled to bus bridge 402 through an AGP bus 410. Several PCI devices 412A-412B are coupled to bus bridge 402 through a PCI bus 414. A secondary bus bridge 416 may also be provided to accommodate an electrical interface to one or more EISA or ISA devices 418 through an EISA/ISA bus 420. In this example, microprocessor 100 is coupled to bus bridge 402 through a CPU bus 424 and to an optional L2 cache 428. In some embodiments, the microprocessor 100 may include an integrated L1 cache (not shown).

Bus bridge 402 provides an interface between microprocessor 100, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between microprocessor 100 and bus bridge 402 in other embodiments. Alternatively, the external cache may be coupled to bus bridge 402 and cache control logic for the external cache may be integrated into bus bridge 402. L2 cache 428 is shown in a backside configuration to microprocessor 100. It is noted that L2 cache 428 may be separate from microprocessor 100, integrated into a cartridge (e.g., slot 1 or slot A) with microprocessor 100, or even integrated onto a semiconductor substrate with microprocessor 100.

Main memory 200 is a memory in which application programs are stored and from which microprocessor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 412A-412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 200. Graphics controller 408 may therefore be a master of AGP bus 410 in that it can request and receive access to a target interface within bus bridge 402 to thereby obtain access to main memory 200. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g., microprocessor 100a shown as an optional component of computer system 400). Microprocessor 100a may be similar to microprocessor 100. More particularly, microprocessor 100a may be an identical copy of microprocessor 100 in one embodiment. Microprocessor 100a may be connected to bus bridge 402 via an independent bus (as shown in FIG. 5) or may share CPU bus 224 with microprocessor 100. Furthermore, microprocessor 100a may be coupled to an optional L2 cache 428a similar to L2 cache 428.

Figure 6:
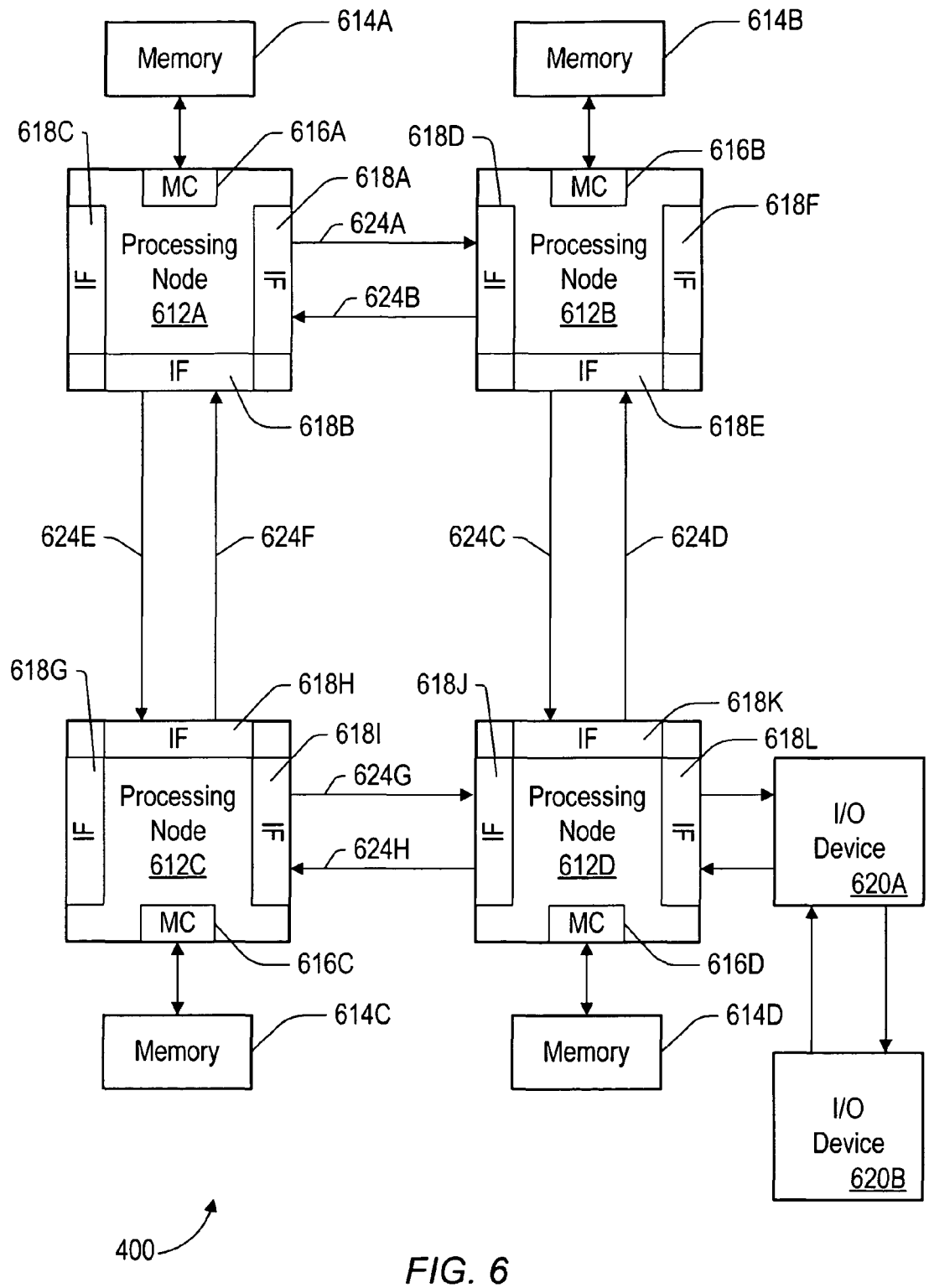
FIG. 6 shows another embodiment of a computer system.

Turning now to FIG. 6, another embodiment of a computer system 400 that may include a trace cache generator 170 as described above is shown. Other embodiments are possible and contemplated. In the embodiment of FIG. 6, computer system 400 includes several processing nodes 612A, 612B, 612C, and 612D. Each processing node is coupled to a respective memory 614A-614D via a memory controller 616A-616D included within each respective processing node 612A-612D. Additionally, processing nodes 612A-612D include interface logic used to communicate between the processing nodes 612A-612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A-620B in a daisy chain configuration) via interface logic 618L. Other processing nodes may communicate with other I/O devices in a similar fashion.

Processing nodes 612A-612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C-624H are used to transmit packets between other processing nodes as illustrated in FIG. 6. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 6. Any suitable routing algorithm may be used. Other embodiments of computer system 400 may include more or fewer processing nodes then the embodiment shown in FIG. 6.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A-612D, in addition to a memory controller and interface logic, may include one or more microprocessors. Broadly speaking, a processing node includes at least one microprocessor and may optionally include a memory controller for communicating with a memory and other logic as desired. More particularly, each processing node 612A-612D may include one or more copies of microprocessor 100. External interface unit 18 may includes the interface logic 618 within the node, as well as the memory controller 616.

Memories 614A-614D may include any suitable memory devices. For example, a memory 614A-614D may include one or more RAMBUS DRAMs (RDRAMs), synchronous DRAMs (SDRAMs), static RAM, etc. The address space of computer system 400 is divided among memories 614A-614D. Each processing node 612A-612D may include a memory map used to determine which addresses are mapped to which memories 614A-614D, and hence to which processing node 612A-612D a memory request for a particular address should be routed. In one embodiment, the coherency point for an address within computer system 400 is the memory controller 616A-616D coupled to the memory storing bytes corresponding to the address. In other words, the memory controller 616A-616D is responsible for ensuring that each memory access to the corresponding memory 614A-614D occurs in a cache coherent fashion. Memory controllers 616A-616D may include control circuitry for interfacing to memories 614A-614D. Additionally, memory controllers 616A-616D may include request queues for queuing memory requests.

Interface logic 618A-618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A-620B may be any suitable I/O devices. For example, I/O devices 620A-620B may include devices for communicate with another computer system to which the devices may be coupled (e.g., network interface cards or modems). Furthermore, I/O devices 620A-620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
an instruction cache configured to store instructions;
a branch prediction unit;
a trace cache configured to store a plurality of traces of instructions; and
a prefetch unit coupled to the instruction cache, the branch prediction unit, and the trace cache;
wherein the prefetch unit is configured to fetch instructions from the instruction cache until the branch prediction unit outputs a predicted target address;
wherein the prefetch unit is configured to check the trace cache for a match for the predicted target address in response to the branch prediction unit outputting the predicted target address;
wherein the prefetch unit is configured to not check the trace cache for a match until the branch prediction unit outputs the predicted target address; and
wherein in response to the prefetch unit identifying a match for the predicted target address in the trace cache, the prefetch unit is configured to fetch one or more of the plurality of traces from the trace cache.

2. The microprocessor of claim 1, wherein the branch prediction unit is configured to output the predicted target address in response to a prediction that a branch will be taken.

3. The microprocessor of claim 1, wherein the branch prediction unit is configured to output the predicted target address in response to detection of a branch misprediction.

4. The microprocessor of claim 1, further comprising a trace generator, wherein the trace generator is configured to begin a trace with an instruction corresponding to a label boundary.

5. The microprocessor of claim 4, wherein the trace generator is configured to check the trace cache for a duplicate copy of the trace that the trace generator is constructing.

6. The microprocessor of claim 5, wherein in response to the trace generator identifying a duplicate copy of the trace, the trace generator is configured to discard the trace under construction.

7. The microprocessor of claim 5, wherein in response to the trace generator identifying an entry corresponding to a duplicate copy of the trace, the trace generator is configured to check the trace cache for an entry corresponding to a next trace to be generated.

8. The microprocessor of claim 7, wherein in response to the trace generator identifying a trace entry corresponding to the next trace to be generated, the trace generator is configured to discard the trace under construction.

9. The microprocessor of claim 4, wherein the trace generator is configured to generate traces in response to instructions being retired.

10. The microprocessor of claim 4, wherein the trace generator is configured to generate traces in response to instructions being decoded.

11. The microprocessor of claim 1, wherein each of the plurality of traces comprises partially-decoded instructions.

12. The microprocessor of claim 1, wherein each of the plurality of traces is associated with a tag comprising the address of an earliest instruction, in program order, stored within that trace.

13. The microprocessor of claim 1, wherein each of the plurality of traces is associated with a flow control field comprising a label for an instruction to which control will pass for each branch operation comprised in that trace.

14. A computer system, comprising:
  a system memory; and
  a microprocessor coupled to the system memory, comprising:
    an instruction cache configured to store instructions;
    a branch prediction unit;
    a trace cache configured to store a plurality of traces of instructions; and
    a prefetch unit coupled to the instruction cache, the branch prediction unit, and the trace cache;
    wherein the prefetch unit is configured to fetch instructions from the instruction cache until the branch prediction unit outputs a predicted target address;
    wherein the prefetch unit is configured to check the trace cache for a match for the predicted target address in response to the branch prediction unit outputting the predicted target address;
    wherein the prefetch unit is configured to not check the trace cache for a match until the branch prediction unit outputs the predicted target address; and
    wherein in response to the prefetch unit identifying a match for the predicted target address in the trace cache, the prefetch unit is configured to fetch one or more of the plurality of traces from the trace cache.

15. The computer system of claim 14, wherein the branch prediction unit is configured to output the predicted target address in response to a prediction that a branch will be taken.

16. The computer system of claim 14, wherein the branch prediction unit is configured to output the predicted target address in response to detection of a branch misprediction.

17. The computer system of claim 14, further comprising a trace generator, wherein the trace generator is configured to begin a trace with an instruction corresponding to a label boundary.

18. The computer system of claim 17, wherein the trace generator is configured to check the trace cache for a duplicate copy of the trace that the trace generator is constructing.

19. The computer system of claim 18, wherein in response to the trace generator identifying a duplicate copy of the trace, the trace generator is configured to discard the trace under construction.

20. The computer system of claim 18, wherein in response to the trace generator identifying an entry corresponding to a duplicate copy of the trace, the trace generator is configured to check the trace cache for an entry corresponding to a next trace to be generated.

21. The computer system of claim 20, wherein in response to the trace generator identifying a trace entry corresponding to the next trace to be generated, the trace generator is configured to discard the trace under construction.

22. The computer system of claim 17, wherein the trace generator is configured to generate traces in response to instructions being retired.

23. The computer system of claim 17, wherein the trace generator is configured to generate traces in response to instructions being decoded.

24. The computer system of claim 14, wherein each of the plurality of traces comprises partially-decoded instructions.

25. The computer system of claim 14, wherein each of the plurality of traces is associated with a tag comprising the address of an earliest instruction, in program order, stored within that trace.

26. The computer system of claim 14, wherein each of the plurality of traces is associated with a flow control field comprising a label for an instruction to which control will pass for each branch operation comprised in that trace.

27. A method, comprising:
  receiving a retired instruction;
  determining if a previous trace under construction duplicates a trace in a trace cache and if the received instruction corresponds to a branch label; and
  in response to determining that a previous trace under construction duplicates a trace in a trace cache and that the received instruction corresponds to a branch label, beginning construction of a new trace.

28. The method of claim 27, further comprising continuing construction of an incomplete trace already in process in response to determining that the incomplete trace does not duplicate a trace in a trace cache.

29. The method of claim 27, further comprising searching the trace cache for duplicate entries subsequent to completion of the previous trace under construction or the new trace.

30. The method of claim 29, further comprising creating a new entry in the trace cache in response to no duplicate entry being identified.

31. The method of claim 29, further comprising discarding a trace in response to a duplicate entry being identified.

32. A method, comprising:
  fetching instructions from an instruction cache;
  continuing to fetch instructions from the instruction cache without searching a trace cache until a branch target address is generated;
  in response to a branch target address being generated, searching a trace cache for an entry corresponding to the branch target address.

33. The method of claim 32, further comprising continuing to fetch instructions from the instruction cache in response to no entry being identified in the trace cache corresponding to the branch target address.

34. The method of claim 32, further comprising fetching one or more traces from the trace cache in response to an entry being identified in the trace cache corresponding to the branch target address.

35. A microprocessor, comprising:
  means for receiving a retired operation;
  means for determining if a previous trace under construction duplicates a trace in a trace cache and if the received operation is a first operation at a branch label; and
  means for starting a new trace in response to determining that a previous trace under construction duplicates a trace in a trace cache and that the received operation is a first operation at a branch label.

* * * * *